(12) United States Patent
Astecker et al.

(10) Patent No.: US 11,296,368 B2
(45) Date of Patent: *Apr. 5, 2022

(54) RECHARGEABLE BATTERY COMPRISING A COOLING DEVICE

(71) Applicant: Miba eMobility GmbH, Laakirchen (AT)

(72) Inventors: Stefan Astecker, Schoerfling (AT); Stefan Gaigg, Gmunden (AT); Falk Nickel, Gmunden (AT); Thilo Schmitt, Seewalchen am Attersee (AT)

(73) Assignee: Miba eMobility GmbH, Laakirchen (AT)

( * ) Notice: Subject to any disclaimer, the term of this patent is extended or adjusted under 35 U.S.C. 154(b) by 173 days.

This patent is subject to a terminal disclaimer.

(21) Appl. No.: 16/621,766

(22) PCT Filed: Jun. 8, 2018

(86) PCT No.: PCT/AT2018/060120
§ 371 (c)(1),
(2) Date: Dec. 12, 2019

(87) PCT Pub. No.: WO2018/227223
PCT Pub. Date: Dec. 20, 2018

(65) Prior Publication Data
US 2020/0153056 A1    May 14, 2020

(30) Foreign Application Priority Data
Jun. 13, 2017  (AT) .............. A 50491/2017

(51) Int. Cl.
| H01M 10/613 | (2014.01) |
| H01M 10/6556 | (2014.01) |
| H01M 10/6568 | (2014.01) |
| H01M 10/625 | (2014.01) |

(52) U.S. Cl.
CPC ..... *H01M 10/613* (2015.04); *H01M 10/6556* (2015.04); *H01M 10/6568* (2015.04); *H01M 10/625* (2015.04); *H01M 2220/20* (2013.01)

(58) Field of Classification Search
CPC .......... H01M 10/613; H01M 10/6556; H01M 10/6568; H01M 10/625; H01M 2220/20; H01M 50/20; H01M 10/6557; Y02E 60/10
See application file for complete search history.

(56) References Cited

U.S. PATENT DOCUMENTS

| 7,291,420 | B2 | 11/2007 | Bitsche et al. |
| 8,852,772 | B2 | 10/2014 | Mcdonald |
| 8,889,282 | B2 | 11/2014 | Goesmann et al. |
| 8,962,172 | B2 | 2/2015 | Bolze et al. |
| 9,546,827 | B2 | 1/2017 | Ludwig et al. |
| 9,559,387 | B2 | 1/2017 | Obrist et al. |
| 2002/0177035 | A1 | 11/2002 | Oweis et al. |
| 2004/0004461 | A1 | 1/2004 | Hamada et al. |
| 2005/0089750 | A1 | 4/2005 | Ng et al. |
| 2007/0037050 | A1 | 2/2007 | Rigobert et al. |
| 2008/0179315 | A1 | 7/2008 | Suzuki et al. |
| 2008/0311468 | A1 | 12/2008 | Hermann et al. |
| 2011/0304297 | A1 | 12/2011 | Sohn |
| 2012/0107635 | A1* | 5/2012 | Hirsch ................ H01M 10/658 428/596 |
| 2012/0231313 | A1 | 9/2012 | Kumar et al. |
| 2013/0122331 | A1 | 5/2013 | Mcdonald |
| 2016/0233561 | A1 | 8/2016 | Lee |
| 2016/0233564 | A1 | 8/2016 | Rinker et al. |
| 2017/0104252 | A1 | 4/2017 | Wuensche et al. |
| 2017/0200926 | A1* | 7/2017 | Motokawa .......... H01M 10/425 |
| 2017/0338532 | A1 | 11/2017 | Mott et al. |
| 2018/0151929 | A1 | 5/2018 | Song et al. |
| 2018/0238632 | A1* | 8/2018 | Jia ........................ G06F 1/203 |

FOREIGN PATENT DOCUMENTS

| CN | 1745438 A | 3/2006 |
| CN | 206 353 596 U | 7/2017 |
| DE | 9012327 U1 | 11/1990 |
| DE | 100 34 134 A1 | 1/2002 |
| DE | 10 2008 053 311 A1 | 4/2009 |
| DE | 10 2008 034 867 A1 | 1/2010 |
| DE | 10 2008 059 970 A1 | 6/2010 |
| DE | 10 2010 032 460 A1 | 2/2012 |
| DE | 10 2011 075 820 A1 | 11/2012 |
| DE | 10 2011 118 686 A1 | 5/2013 |
| DE | 10 2013 220 044 A1 | 4/2015 |
| DE | 10 2013 221 747 A1 | 4/2015 |
| DE | 10 2013 021 553 A1 | 6/2015 |
| DE | 10 2015 204 678 A1 | 9/2016 |

(Continued)

OTHER PUBLICATIONS

International Search Report in PCT/AT2018/060120, dated Oct. 30, 2018.

*Primary Examiner* — Muhammad S Siddiquee (74) *Attorney, Agent, or Firm* — Collard & Roe, P.C.

(57) ABSTRACT

The invention relates to a rechargeable battery (1) comprising at least one storage module (3) for electrical energy and at least one cooling device (2) for cooling or controlling the temperature of the at least one storage module (3), wherein the cooling device (2) has at least one coolant channel (6), at least one coolant inlet (8) and at least one coolant outlet (9) and wherein the cooling device (2) has a single-layer or multi-layer film (4) and lying with this film (4) against the at least one storage module (3).

10 Claims, 4 Drawing Sheets

(56) References Cited

FOREIGN PATENT DOCUMENTS

| | | |
|---|---|---|
| EP | 1 261 065 A2 | 11/2002 |
| EP | 2 451 004 A1 | 5/2012 |
| EP | 2 744 033 A1 | 6/2014 |
| FR | 2 782 399 A1 | 2/2000 |
| FR | 3013515 A1 | 5/2015 |
| JP | 2006-271063 A | 10/2006 |
| JP | 2014-078471 A | 5/2014 |
| WO | 2010/012341 A1 | 2/2010 |
| WO | 2010/108885 A1 | 9/2010 |
| WO | 2011/088997 A1 | 7/2011 |
| WO | 2012/062644 A1 | 5/2012 |
| WO | 2012/072348 A1 | 6/2012 |
| WO | 2017/015826 A1 | 2/2017 |
| WO | 2017/108581 A1 | 6/2017 |

* cited by examiner

RECHARGEABLE BATTERY COMPRISING A COOLING DEVICE

CROSS REFERENCE TO RELATED APPLICATIONS

This application is the National Stage of PCT/AT2018/060120 filed on Jun. 8, 2018, which claims priority under 35 U.S.C. § 119 of Austrian Application No. A 50491/2017 filed on Jun. 13, 2017, the disclosure of which is incorporated by reference. The international application under PCT article 21(2) was not published in English.

The invention relates to a rechargeable battery with at least one storage module for electrical energy and at least one cooling device for the at least one storage module, wherein the cooling device comprises at least one coolant channel, at least one coolant inlet and at least one coolant outlet.

The service life and effectiveness as well as the safety of a rechargeable battery for e-mobility depend, among other factors, on the temperature during operation. For this reason, various concepts have been suggested for the cooling and/or temperature control of the rechargeable batteries. These concepts can be divided into essentially two types, namely air cooling and water cooling and/or in general cooling with liquids.

For water cooling, cooling bodies in which at least one coolant channel is formed are used. These cooling bodies are arranged between the individual modules of the rechargeable battery or on the modules. In this regard, a module is an individual unity of the rechargeable battery, i.e. not obligatorily just a cell.

In the arrangement on the modules, the cooling bodies are usually designed such that they cover all modules of the rechargeable battery. However, this results in the problem that due to tolerances etc. the cooling body does not lie against the modules evenly. To remedy this, the cooling body is screwed to each individual module. However, this entails the disadvantage that the production of the rechargeable battery is correspondingly complex and thus cost-intensive. Thus, in turn, impairs the acceptance of e-mobility per se.

The present invention is based on the object of creating a structurally simple cooling option for rechargeable batteries for e-mobility.

In the aforementioned rechargeable battery, the object of the invention is achieved in that the cooling device comprises a single-layer or multi-layer film and lies against the at least one storage module with said film.

The advantage of this is that the flexible film lies against the surfaces of the rechargeable battery better, which allows for heat transmission into the cooling fluid to be improved without additional measured. It is not necessary any more to connect the cooling device to each individual module of a rechargeable battery. When taking into consideration that such rechargeable batteries often comprise more than 20 modules, a significant reduction of the manufacturing time of the rechargeable batteries can consequently hence be achieved. Moreover, a reduction in weight can be achieved by the film, which can serve to improve the effectiveness of the e-mobility by higher ranges.

According to an embodiment variant of the rechargeable battery, it can be provided for that the cooling device comprises a layer from a metal, to which the film is connected forming the at least one coolant channel Hence, a further improvement of the cooling of the rechargeable battery can be achieved by a part of the heat being removed by heat conduction via this metal layer. Furthermore, this can also provide the cooling device with improved stability if this layer of metal is formed to be stiff and forms a lid of the cooling device and optionally a lid of the rechargeable battery.

According to another embodiment variant, it can be provided for that the cooling device comprises a further single-layer or multi-layer film, wherein the film and the further film are connected to one another forming the at least one coolant channel between the film and the further film. The advantage of this is that the cooling device is simply constructed of and/or consists of two film materials connected to one another. An additional arrangement and/or an additional incorporation of the coolant channel can be dispensed with since it is automatically created by the partial connection of the two film materials. The production of the cooling device can be carried out mainly automatically, while as regards the geometry of the cooling device and the concrete design of the at least one coolant channel there are merely very little restrictions as well.

According to a further embodiment variant, the film can consist of a laminate comprising a first plastic film, an enforcement layer connected thereto, a metal film connected to the enforcement layer or a metalized further plastic film connected to the enforcement layer. By means of the enforcement layer, an improved stiffness and stability can be achieved at the operating temperature of the rechargeable battery. Moreover, it became apparent that these films have a lower creeping tendency. The film thus further has a reduced thermal expansion, which leads to less stresses in the cooling device in case of temperature changes. By means of the metal film and/or the metalized further plastic film, a better heat distribution across the surface of the cooling device is achieved, whereby its efficiency can be improved. By the better heat distribution due to the improved thermal conductivity of the film, moreover, hotspots can be better prevented during operation of the cooling device. Besides this, the cooling device can hence be provided with a barrier function.

The further film can also comprise at least one second plastic film, which is partially connected to the first plastic film of the laminate of the film in connection areas, such that between the connection areas at least one cavity is formed, which forms the at least one coolant channel. This can serve to further simplify the production of the cooling device.

For the aforementioned reasons regarding the laminate of the film, according to a further embodiment variant it can be provided for that the further film also consists of a laminate comprising the second plastic film, an enforcement layer connected thereto, a metal film connected to the enforcement layer of a metalized further plastic film connected to the enforcement layer.

It can also be provided for that the enforcement layer comprises a fiber reinforcement. With the fiber reinforcement, the coefficient of thermal expansion of the enforcement element can be reduced and be approximated to the value of the films. Thus, the heat transfer element can have fewer residual stresses and a lower tendency to warp.

In this regard, according to an embodiment variant, the fiber reinforcement can be formed of a woven fabric, whereby a further improvement of the mechanical behavior of the cooling device can be achieved.

It is also possible that the first plastic film and/or the second plastic film and/or the metalized further plastic film consists/consist of a plastic material that is selected from a group consisting of PE, POM, PA, PPS, PET, cross-linked polyolefins, thermoplastic elastomers on ether/ester basis, styrene block copolymers, silicone elastomers. These plastic materials have proved to be particularly advantageous for use in producing the cooling device with a higher degree of automation due to the improved extrusion capability.

To increase the cooling performance, it can be provided for that in the direction towards the at least one storage module several films are arranged perpendicularly on top of one another and several cooling channels are formed between these films. In this regard, the use of the film and optionally of the further film proves to be advantageous, since hence despite the higher cooling performance, a lower weight of the cooling device can be achieved.

Between the several films arranged on top of one another, according to an embodiment variant, a fiber layer can be arranged, whereby a further weight reduction can be achieved, in particular if according to an embodiment variant it is provided for that the coolant channel or the coolant channels is or are at least partially formed in the fiber layer.

According to another embodiment variant, it can be provided for that the outlet and/or the inlet is formed by a distancing element between the film and the further film. Thus, a better separation of the films of the cooling device in the region of the at least one coolant channel at least in the region of the inlet and/or outlet can be achieved, while at the same time an improved leakproofness of the cooling device in these regions can be achieved more easily.

For the purpose of better understanding of the invention, it will be elucidated in more detail by means of the figures below.

These respectively show in a simplified schematic representation.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
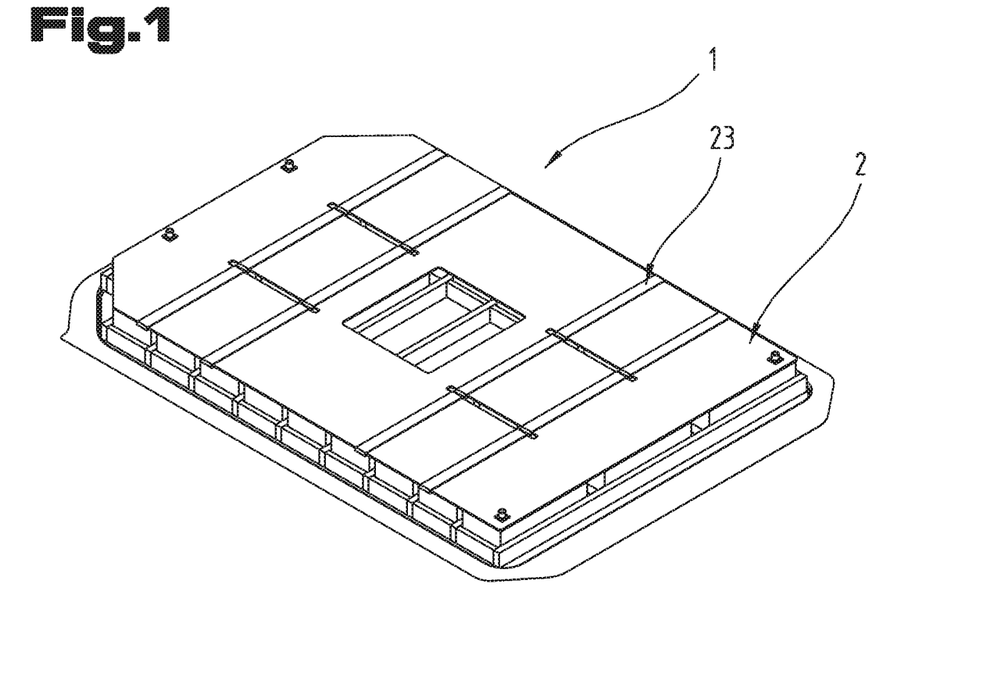
FIG. 1 a rechargeable battery in an oblique view with a cooling device.
Figure 2:
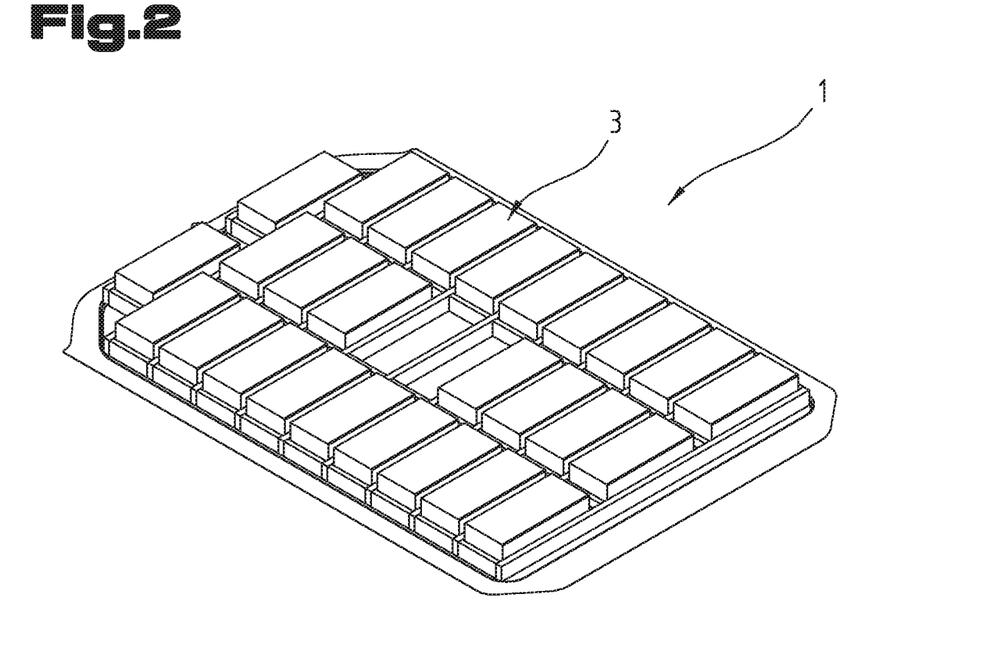
FIG. 2 the rechargeable battery according to FIG. 1 in an oblique view without the cooling device.

FIGS. 1 and 2 show a rechargeable battery 1, i.e. an accumulator, in an oblique view, with FIG. 1 showing the rechargeable battery 1 with a cooling device 2 and FIG. 2 showing the rechargeable battery 1 without this cooling device 2.

The rechargeable battery 1 comprises several storage modules 3 for electrical energy. In the represented example there are 27 storage modules 3. However, this number is not to be considered restricting.

As the basic construction of such rechargeable batteries 1 for e-mobility is known from the prior art, reference is made thereto so as to avoid repetitions. The following description is thus restricted to the cooling of the rechargeable battery 1.

Reference is made to the fact that the temperature control of the rechargeable battery 1 is also covered by the term "cooling" within the meaning of the invention.

As can be seen from the comparison of the two FIGS. 1 and 2, the cooling device 2 is arranged on a side of the rechargeable battery 1, in particular on the top. However, it can also be provided for that the cooling device 2 extends across at least two surfaces of the rechargeable battery 1, for example on the top and laterally and optionally on the bottom.

It is further preferred if the cooling device 2 extends across all storage modules 3, in particular the upper side of the storage modules 3, (as can be seen from FIG. 1) such that all storage modules 3 can be cooled by means of just one cooling device 2. However, in general, it is also possible to provide several cooling devices 2 in the rechargeable battery, for example two or three or four, such that for example the storage modules 3 are distributed to two or three or four, etc. cooling devices 2.

Reference is made to the fact that the terms upper side etc. refer to the installation position of the rechargeable battery 1 in a motor vehicle.

Figure 3:
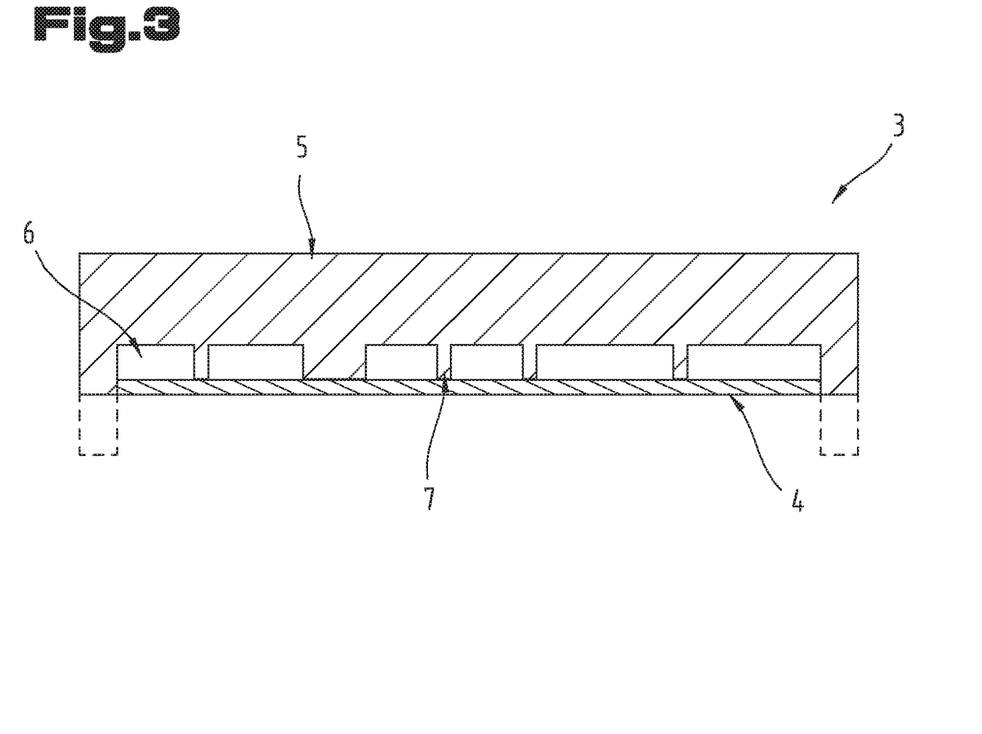
FIG. 3 a first embodiment variant of the cooling device.

FIG. 3 shows a first embodiment variant of the cooling device 3 in cross-section.

In general, the cooling device 2 comprises a single-layer or multi-layer film 4 in all embodiment variants. By means of this film 4, the cooling device 2, in particular directly, lies against the storage module 3 or the storage modules 3. The contact is for example established at the upper side of the storage modules 3, as was elucidated above. As the film 4 is flexible, i.e. not stiff, said film 4 can better adapt to surface irregularities of the storage modules 3 or between the storage modules 3. A leveling compound between the cooling device 2 and the storage modules 3 is not required. Hence, heat transmission from the storage modules 3 into the cooling device 2 can be improved.

In the embodiment variant of the cooling device 2 according to FIG. 3, this film 4 is connected to a layer 5. The layer 5 is formed of a metal, in particular aluminum and/or an aluminum alloy. Between the layer 5 and the film 4, a coolant channel 6 is formed. For this purpose, the layer 5 can comprise webs 7 that point towards the film 4 and the end faces of which are connected to the film 4.

The at least one coolant channel 6 can also be produced differently. For example, the layer 5 can be reformed, e.g. deep-drawn, accordingly. In the alternative or in addition to this, the film 4 can be machined shapingly, whereby in this case the flexibility of the film 4 is reduced at least in the region of the at least one coolant channel 6, for example by coating the film 4 at least in this region. It can hence be achieved that the film 4 maintains the shape at least in the region of the at least one coolant channel 6.

The film 4 can be adhered to the layer 5. However, other connecting techniques can also be applied to connect the film 4 to the layer 5. The connecting techniques are preferably selected such that no additional measures need to be taken to obtain a liquid-tight design of the connection.

As can be seen from FIG. 3, the layer 5 is arranged and/or formed to laterally overlap the film 3. However, it is also possible that the film 4 extends to the outside, and in particular to end flush with the layer 5.

It can further be provided for that the part of the layer 5 laterally overlapping the film 4 projects further beyond the film 4, as is shown in dashed lines in FIG. 3, such that the cooling device 2 can be formed as lid for the rechargeable battery 1 more easily, since it can simply be plugged on in this case. However, the cooling device 1 with the stiff layer 5 can be generally used as lid of the rechargeable battery 1.

Figure 4:
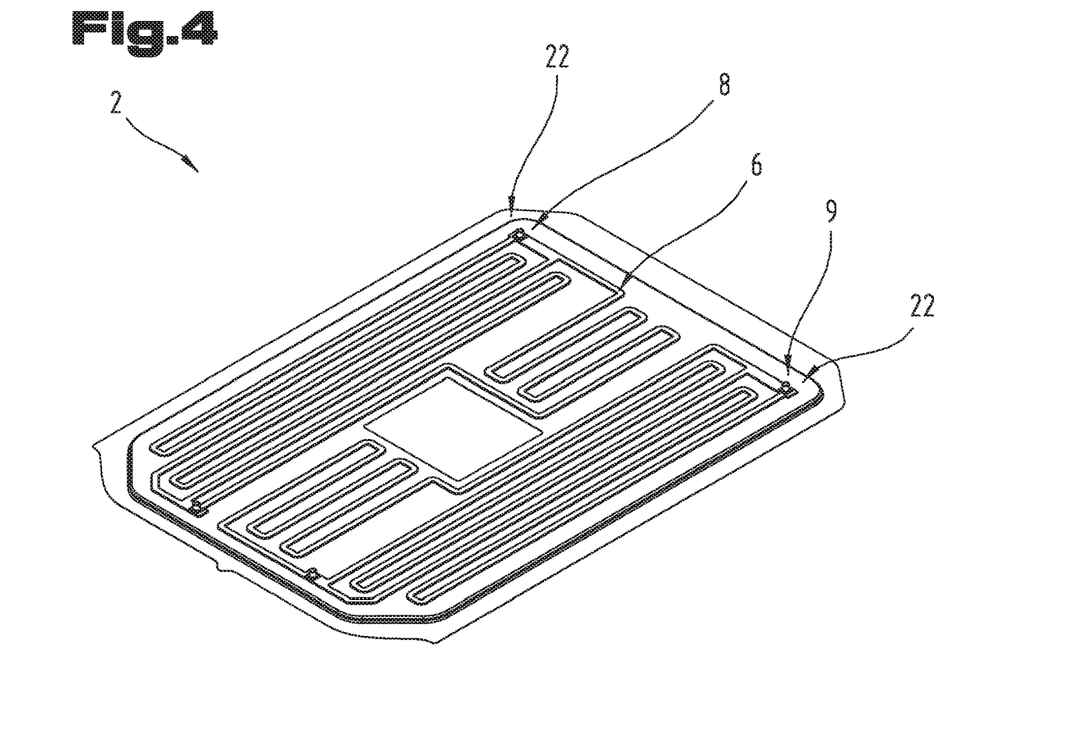
FIG. 4 a cutout from the cooling device.

FIG. 4 shows an embodiment of the at least one coolant channel 6 in an exemplary manner. As can be seen, the coolant channel 6 can be arranged in the cooling device 2 to extend in a meandering pattern. In this regard, the coolant channel in general extends from a coolant inlet 8 to a coolant outlet 9 of the cooling device 2.

The concrete representation of the extent of the at least one coolant channel 6 in FIG. 4 is to be understood merely as an example. The respectively optimized extent of the at least one coolant channel 6 is among other factors determined by the amount of heat that needs to be conducted away, the geometry of the rechargeable battery 1, etc. It can also be provided for that more than one coolant channel 6 is formed and/or arranged in the cooling device 2. In this case, it is advantageous if a common inlet is arranged in front of the several coolant channels and a common outlet behind them, which can each be formed as collecting channels, from which the coolant channels branch out or into which they flow. However, it is also possible that each coolant channel 6 has its own coolant inlet 8 and/or its own coolant outlet 9.

Further, in FIG. 4, the coolant inlet 8 and the coolant outlet 9 are arranged on one side of the cooling device 2. However, the coolant inlet 8 and the coolant outlet 9 can also be arranged and/or formed on and/or in different sides of the cooling device 2.

In particular, a liquid such as a water-glycol mixture is used as the coolant by which the cooling device 2 is flown through.

Further and optionally independent embodiment variants of the rechargeable battery 1 and/or the cooling device 2 of the rechargeable battery 1 are shown in FIGS. 5 to 9, wherein again, equal reference numbers and/or component designations are used for equal parts as in FIGS. 1 through 3 before. In order to avoid unnecessary repetitions, it is pointed to/reference is made to the detailed description regarding FIGS. 1 to 3.

Figure 5:
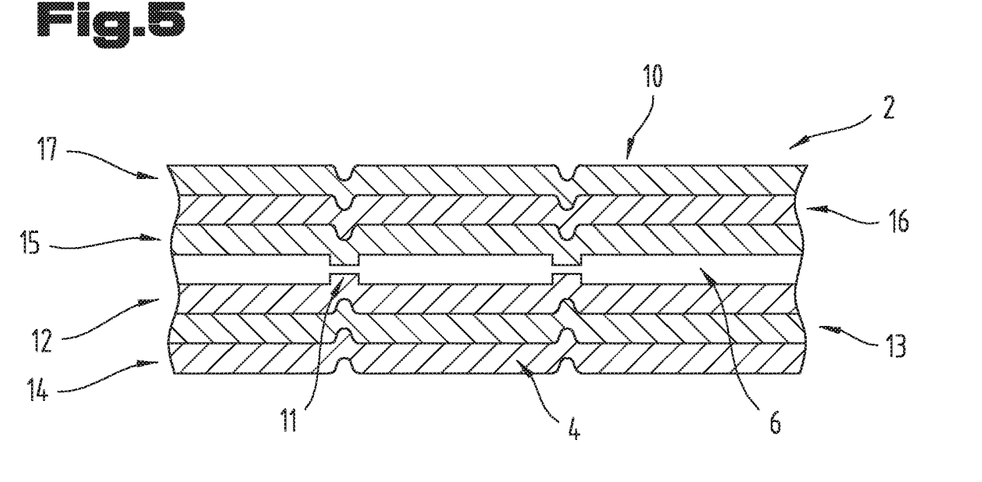
FIG. 5 a cutout from another embodiment variant of the cooling device.

FIG. 5 shows a cutout of a preferred embodiment variant of the cooling device 2 in cross-section.

The cooling device 2 comprises the film 4 and a further single-layer or multi-layer film 10. The film 4 and the further film 10 are connected to one another in connection areas 11 forming the at least one coolant channel 6 between the film 4 and the further film 10. The connection areas 11 extend along the longitudinal extent of the at least one coolant channel 6, wherein between the connection areas 11 non-connected areas remain in which the at least one coolant channel 6 is formed by the distancing of the film 4 with respect to the further film 10. The film 4 and the further film 10, which is in particular arranged above the film 4, extend across a surface which preferably at least approximately, in particular to 100%, corresponds to the surface of the cooling device 2 (as viewed in a plan view).

In the cooling device 2 according to the embodiment variant of FIG. 3, the film 4 can also extend across at least approximately, in particular to 100%, the surface of the cooling device 2 (as viewed in a plan view).

In this embodiment variant of the cooling device 2, the film 4 consists of a laminate comprising a first plastic film 12, an enforcement layer connected thereto, a metal film 14 connected to the enforcement layer 13 or a metalized further plastic film connected to the enforcement layer 13.

The at least one coolant channel 6 is not formed by separate components but by the just partial connection of the film 4 to the further film 10. The wall and/or the walls of the at least one coolant channel 6 are thus formed by the film 4 and the further film 10, preferably half by each.

Preferably, the further film 10 comprises at least one second plastic film 15 and/or consists thereof. The second plastic film 15 is partially connected to the first plastic film 12 of the laminate of the film 4 in connection areas 11 such that between the connection areas 11 at least one cavity is formed which forms the at least one coolant channel 6.

It can further be provided for that according to an embodiment variant in this regard, the further film 10 also consists of a laminate comprising the second plastic film 15, an enforcement layer 16 connected thereto, a metal film 17 connected to the enforcement layer 16 or a metalized further plastic film connected to the enforcement layer 16.

In general, other laminates can be used as well. For example, merely the film 4 can be provided with the metal film 14 or merely the further film 10 can be provided with the metal film 17. Likewise, merely the film 4 can comprise the enforcement layer 13 or merely the further film 10 can comprise the enforcement layer 16. Likewise, structures of the film 4 and/or the further film 10 with more than three layers are possible. However, preferably, the film 4 and the further film 14 are designed equally.

The enforcement layer 16 and/or the metal film 17 of the further film 10 can differ from the enforcement layer 13 and/or the metal film 14 of the film 4. However, preferably, the two enforcement layers 13, 16 and/or the two metal films 14, 17 are designed equally.

The two films 4, 10 are arranged such that the two plastic films 12, 15 lie against one another and the mentioned partial connected is formed via these plastic films 12, 16. If the further film 10 comprises (merely) the second plastic film 15, said second plastic film 15 is arranged directly adjacent to the plastic film 12 of the film 4 and connected thereto.

Instead of a metal film 14, 17, a metalized further plastic film can also be used, while in this case the metalization is preferably arranged between the enforcement layer 13, 16 and the further plastic film.

The first plastic film 13 and/or the second plastic film 16 and/or the metalized further plastic film preferably consists/consist to at least 80 wt. %, in particular at least 90 wt. %, of a thermoplastic material or of an elastomer. The thermoplastic material can be selected from a group comprising and/or consisting of polyethylene (PE), polyoxymethylene (POM), polyamide (PA), in particular PA 6, PA 66, PA 11, PA 12, PA 610, PA 612, polyphenylene sulphide (PPS), polyethylene terephthalate (PET), crosslinked polyolefins, preferably polypropylene (PP). The elastomer can be selected from a group comprising and/or consisting of thermoplastic elastomers such as thermoplastic vulcanizates, olefin-, amine-, ester-based thermoplastic polyurethanes, in particular ether/ester-based thermoplastic elastomers, styrene block copolymers, silicone elastomers.

At this point, it should be noted that the term plastic material is understood as a synthetic or natural polymer produced from corresponding monomers.

Preferably, the first plastic film 12 and/or the second plastic film 15 and/or the metalized further plastic film consists/consist of a so-called sealing film. This has the advantage that the respective films can be connected to one another directly.

However, it is also possible to use other plastic materials, such as thermosetting plastic materials and/or thermosetting materials, which are then for example adhered to one another by means of an adhesive. Two-part adhesive systems based on polyurethane or silicone or hot melt adhesive systems are particularly suitable for this purpose.

Preferably, the enforcement layer/enforcement layers 13, 16 comprise/comprises a or consist/consists of a fiber reinforcement.

The fiber reinforcement is preferably formed as a separate layer, which is arranged between the plastic film 12 and/or the plastic film 15 and the metal film 14 and/or the metal film 17 or the metalized further plastic film. If cavities are formed in the fiber reinforcement, these can also be at least partially filled with the plastic material of the plastic film 12 and/or the plastic film 15 or the metalized further plastic film.

The fiber reinforcement can be formed of fibers and/or threads, which are selected from a group comprising or consisting of glass fibers, aramid fibers, carbon fibers, mineral fibers such as basalt fibers, natural fibers such as hemp, sisal and combinations thereof.

Preferably, glass fibers are used as fiber reinforcement. The proportion of the fibers, in particular the glass fibers, in the fiber reinforcement can amount to at least 80 wt. %, in particular at least 90 wt. %. Preferably, the fibers and/or threads of the fiber reinforcement consist merely of glass fibers.

The fibers and/or threads can be present in the fiber reinforcement as roving, for example as a non-woven fabric. However, preferably the fibers and/or threads become a woven fabric or a knitted fabric. In this regard, it is also possible that the woven or knitted fabric is merely present in some regions and that the remaining regions of the fiber reinforcement are formed by a roving.

It is also possible that rubberized fibers and/or threads are used as or for the fiber reinforcement.

When using a woven fabric, different types of weaves are possible, in particular plain, twill or satin weave. Preferably, a plain weave is used.

However, it is also possible to use an open-mesh glass fabric or glass roving.

The fiber reinforcement can be formed as a single layer. However, it is also possible that the fiber reinforcement comprises several, optionally separate, individual layers, for example two or three, wherein at least individual or several individual layers can at least in some regions, preferably entirely, consist of fibers and/or threads different as compared to the rest of the individual layers.

In the alternative or in addition to the fiber reinforcement, the enforcement layer(s) 13, 16 can comprise a mineral filling. For example, calcium carbonate, talc, quartz, wollastonite, kaolin or mica can be used as a mineral filling (mineral filler material).

The metal film 15, 17 in particular is an aluminum film. However, other materials such as copper or silver can also be used.

The metal film 15, 17 can have a layer thickness of between 5 μm and 100 μm.

In case of the use of the metalized further plastic film, the mentioned metals can be used for the metalization. Preferably, the metalization has a layer thickness selected from a range of between 5 nm and 100 nm. The metal vapor deposition of the further plastic film can be carried out by means of a method known from the prior art.

The plastic film 12 and/or the plastic film 15 and/or the further plastic film, which comprise the metalization, can have a layer thickness of between 10 μm and 200 μm.

The layer thickness of the enforcement layer(s) 14, 16 can amount to between 5 μm and 50 μm.

The film 4 and/or the further film 10 can in particular comprise the following structure in the indicated order:
plastic film 12 and/or plastic film 15 of PP;
enforcement layer 13, 16 of a glass fiber fabric;
metal film 14, 17 of aluminum with a layer thickness of 12 μm.

In case of the further film 10 consisting merely of the plastic film 15, preferably a polyethylene terephthalate (PET) is used as the plastic material for it.

The film 4 and/or the further film 10 can also comprise at least one further layer, such as at least one further enforcement layer and/or at least one primer layer and/or at least one thermotropic layer.

Although the film 4 and the further film 10, if it also is a film laminate, can in general be used in the form of individual films for producing the cooling device 2, such that the film laminate(s) are only formed in the course of the production of the cooling device 2, it is advantageous if the first film 4 and/or the further film 10 are used as a (laminated) semi-finished product.

For connecting the individual layers of the laminate or the laminates, these can be adhered to one another by means of adhesives. The afore-mentioned adhesives are suitable for this purpose. Besides adhesives, coextrusion and extrusion coating can also be used as joining options. Of course, a combination is also possible in which several plastic materials are coextruded and adhesively laminated to one another with an extrusion-coated metal or (fiber) enforcement layer. In general, all known methods can be used for producing composite films and/or film laminates.

According to a further embodiment variant, it can be provided for that the cooling device 2 comprises at least one additional film, which is partially connected to the film 4 or to the further film 10, as was described above with respect to the connection of the film 4 to the further film 10. The coolant channels 6 can hence be arranged in at least two planes on top of one another, wherein in this case they are preferably not formed congruently but to be laterally offset with respect to one another in the manner described above and/or in the way to be described. In this case, it is advantageous if the film 4 or the further film 10 comprise the plastic film 12 or the plastic film 15 on both outer sides (surfaces), such that via these the connection with the additional films can be established, i.e. in particular again two sealing films can be connected to one another.

Figure 6:
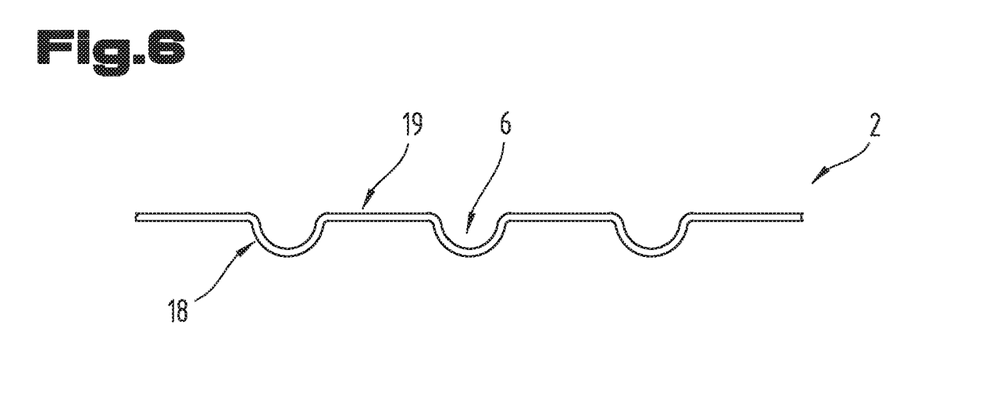
FIG. 6 a cutout from a further embodiment variant of the cooling device.

FIG. 6 shows a cutout of another embodiment variant of the cooling device 2. Therein, a fiber layer 18, for example of a paper, is arranged between the plastic film 12 and the plastic film 15 (both represented in FIG. 5). This fiber layer 18 is designed to be liquid resistant. For this purpose, a coating 19 can be provided on the surfaces that come into contact with the coolant. However, it is also possible that the fibers of the paper and/or of the fiber layer 18 are per se designed to be liquid proof, for example coated.

The coating 19 moreover has another function as well. In the fiber layer 18, the at least one coolant channel 6 is provided, for example by means of embossing or another shaping process. In order to be able to maintain the shape when the rechargeable battery 1 and/or the cooling device 2 is operated, the fiber layer 18 can be provided an increased solidity and/or stiffness by means of the coating 19.

The coating 19 can for example be a cured adhesive layer.

Figure 7:
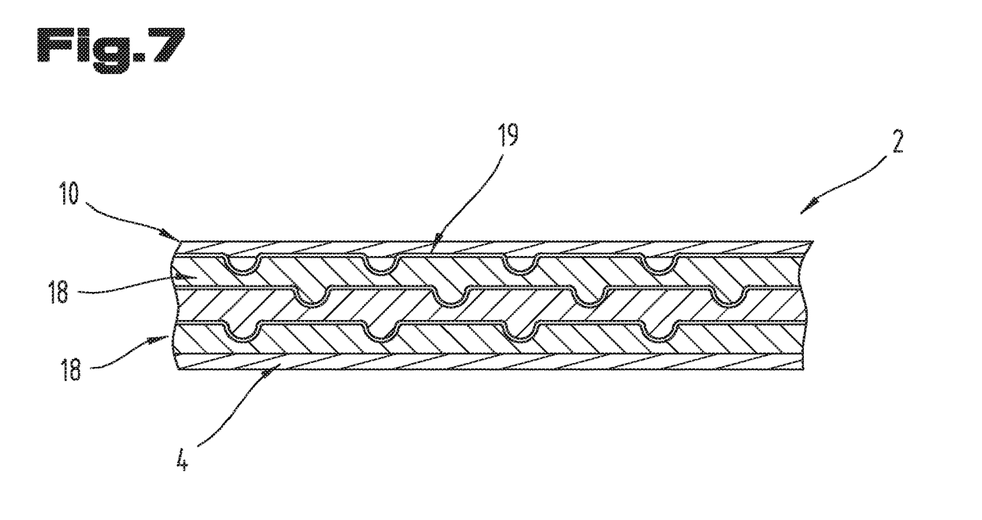
FIG. 7 a cutout from an embodiment variant of the cooling device with several cooling planes on top of one another.

So as to further reduce the weight of the rechargeable battery 1 and/or the cooling device 2, according to a further embodiment variant shown in FIG. 7, it can be provided for that several ones of these fiber layers 18 provided with the coating 19 are arranged between the film 4 and the further film 10 so as to be located one above the other, in particular directly one above the other.

The film 4 and/or the further film 10 can be designed as individual films or as laminates in these embodiment variants of the cooling device 2 as well.

Figure 8:
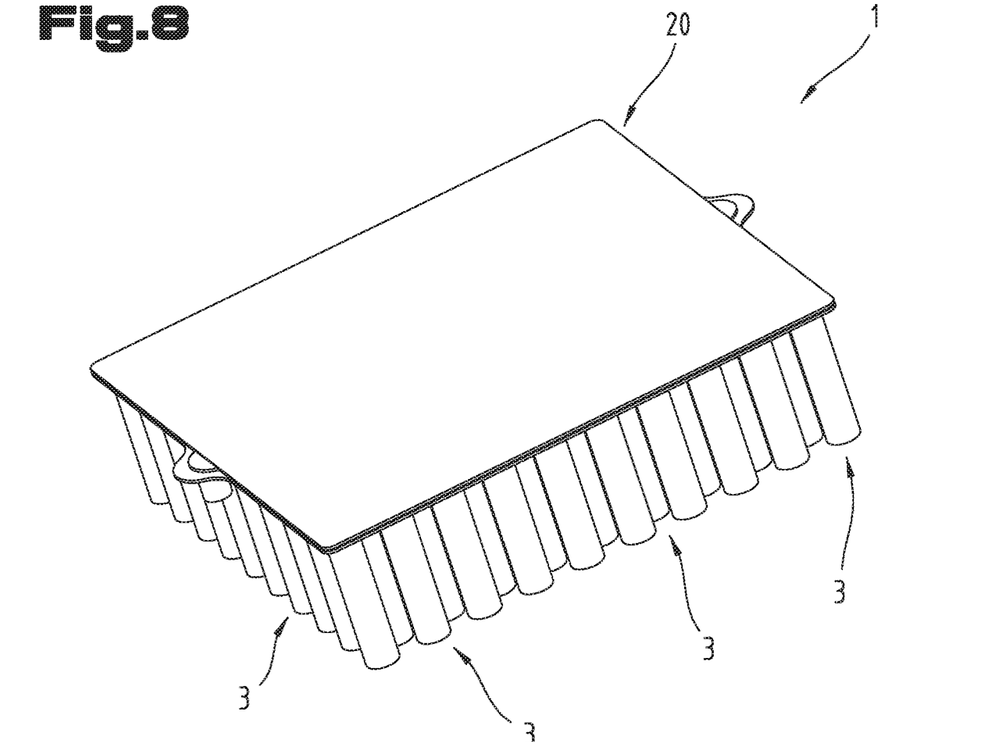
FIG. 8 an embodiment variant of the rechargeable battery in an oblique view.
Figure 9:
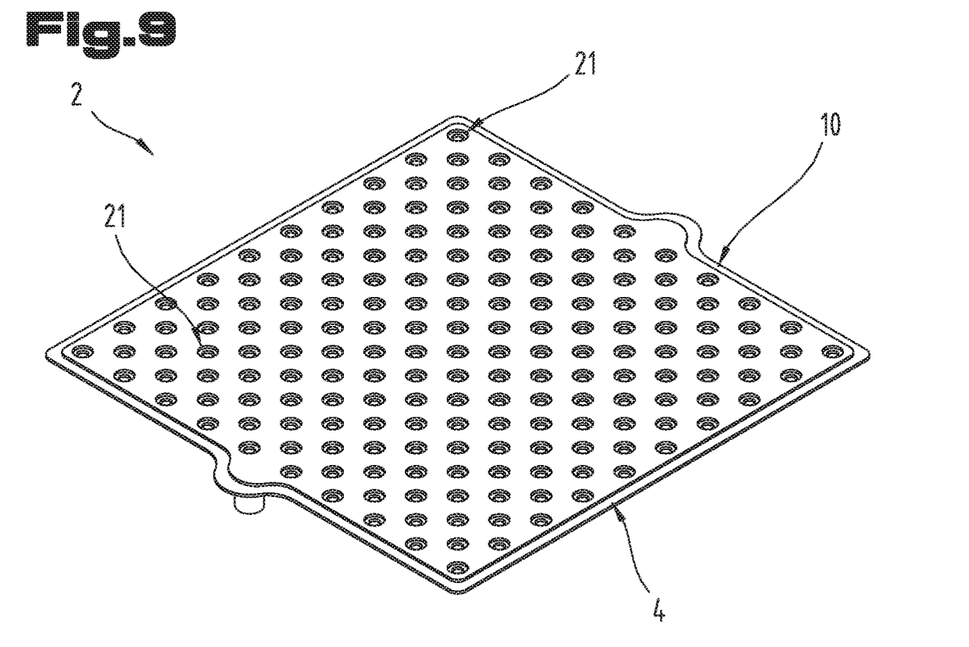
FIG. 9 the cooling device of the rechargeable battery according to FIG. 8 in an oblique view.

FIGS. 8 and 9 show a further embodiment variant of the rechargeable battery 1 and the cooling device 2. Other than in the rechargeable battery 1 according to FIGS. 1 and 2, the storage modules 3 are not designed to be cuboid and in lying arrangement but are designed cylindrically and in standing arrangement.

The cooling device 2 is again formed of and/or comprises the film 4 and the further film 10. In this regard, reference is made to the above description.

In this embodiment variant of the rechargeable battery 1, the cooling device 2 is arranged between the storage modules 3 and an element 20 carrying electronics. The element can for example be a circuit board or a printed circuit and for example also comprise components like a temperature sensor or the busbar(s).

For contacting the individual storage modules 3, the cooling device 2 can comprise corresponding breakthroughs 21 as can be seen from FIG. 9.

In the preferred embodiment variant of the cooling device 2, it also comprises corresponding connecting elements for the connection of the inlet line and the outlet line for the coolant. In general, these can be designed as common connecting elements as are known from the prior art. However, in the preferred embodiment variant, these connecting elements are also at least partially, in particular entirely, made from a plastic material, wherein the aforementioned plastic materials can be used as plastic materials.

According to another embodiment variant of the rechargeable battery 1, it can be provided for that the coolant outlet 9 and/or the coolant inlet 8 is formed by a distancing element 22 between the film 4 and the further film 10. The distancing elements 22 can be seen from FIG. 4. Preferably, the distancing elements are also made from a plastic material. It is further preferred if via the distancing elements 22 the leakproofness of the connections of the cooling device 2 for the coolant is improved.

In this context, it should be noted that the specific placement of the connecting elements depends on the specific design of the at least one coolant channel 6.

The aforementioned collecting channels for the coolant can, just as the at least one coolant channel 6, be produced by means of the just partial connection of the film 4 to the further film 10. In this regard, reference is made to the corresponding explanations above.

The described partial connection of the film 4 to the further film 10 and/or an additional film and/or two plastic films 12, 15 of the laminates can be established in a laminating press. In this regard, the connection can be established by the effect of an increased temperature and an increased pressure, as is known from laminating and/or heat sealing. The specific temperature depends on the used plastic materials.

Instead of the laminating device, a press can also be used, especially for the production of long fiber reinforced films 4, 10 and/or a long fiber reinforced cooling device 2. At this, the fibers are impregnated and pressed with the plastic material, which results in the fiber reinforced film material.

For a higher degree of customizability of the cooling device 2 at a high degree of automation, it can be provided for that a welding robot is used for the connection. Hence, the connection areas 11 (FIG. 5) can be determined and programmed individually such that the arrangement and/or formation of the at least one coolant channel 6 can be adapted to individual requirements very flexibly.

In the two mentioned methods for producing the cooling device 2, the connection of the films 4, 10 to one another and/or the of the film 4 to the layer 5 is established in a materially bonded manner either by welding or adhering, while mixed variants of these methods are also possible. In general, other methods can be used for this purpose as well.

For example, temperature pulse welding, laser welding, IR welding, ultrasonic welding, high-frequency welding can be used as welding methods.

The cooling device 2 can for example be mounted to the rechargeable battery 1 by means of clamps 23 (FIG. 1). However, other fastenings are also possible, for example by means of pins or rivets, etc., although relatively few fastening elements are generally required, as the cooling device 2 preferably continuously extends across the entire face of the rechargeable battery.

The exemplary embodiments show possible embodiment variants, while it should be noted at this point that combinations of the individual embodiment variants are also possible.

Finally, as a matter of form, it should be noted that for ease of understanding of the structure of the rechargeable battery 1 and/or the cooling device 2, these are not obligatorily depicted to scale.

LIST OF REFERENCE NUMBERS 1 rechargeable battery
2 cooling device
3 storage module
4 film
5 layer
6 coolant channel
7 web
8 coolant inlet
9 coolant outlet
10 film
11 connection area
12 plastic film
13 enforcement layer
14 metal film
15 plastic film
16 enforcement layer
17 metal film
18 fiber layer
19 coating
20 element
21 breakthrough
22 distancing element
23 clamp

The invention claimed is:

1. A rechargeable battery comprising at least one storage module for electrical energy and at least one cooling device for cooling or controlling the temperature of the at least one storage module, wherein the cooling device has at least one coolant channel, at least one coolant inlet and at least one coolant outlet, wherein the cooling device has a multi-layer film and with this film lies against the at least one storage module, wherein the film comprises a laminate comprising a first plastic film, an enforcement layer connected thereto, a metal film connected to the enforcement layer or a metalized further plastic film connected to the enforcement layer, wherein the cooling device further comprises a further single-layer or multi-layer film, and wherein the further film comprises at least one second plastic film, which is partially connected to the first plastic film of the laminate of the film in connection areas, such that between the connection areas at least one cavity is formed, which forms the at least one coolant channel.

2. The rechargeable battery according to claim 1, wherein the cooling device comprises a layer from a metal, to which the film is connected forming the at least one coolant channel.

3. The rechargeable battery according to claim 1, wherein the enforcement layer comprises a fiber reinforcement.

4. The rechargeable battery according to claim 3, wherein the fiber reinforcement is formed by a woven fabric.

5. The rechargeable battery according to claim 1, wherein at least one of the first plastic film, the second plastic film, and the metalized further plastic film comprises a plastic material that is selected from a group consisting of PE, POM, PA, PPS, PET, cross-linked polyolefins, thermoplastic elastomers on ether/ester basis, styrene block copolymers, and silicone elastomers.

6. The rechargeable battery according to claim 1, wherein in the direction towards the at least one storage module several films are arranged perpendicularly on top of one another and several cooling channels are formed between these films.

7. The rechargeable battery according to claim 6, wherein a fiber layer is arranged between the several films arranged on top of one another.

8. The rechargeable battery according to claim 7, wherein the coolant channel or the coolant channels is and/or are at least partially formed in the fiber layer.

9. The rechargeable battery according to claim 1, wherein the coolant outlet and/or the coolant inlet is formed by a distancing element between the film and the further film.

10. A rechargeable battery comprising at least one storage module for electrical energy and at least one cooling device for cooling or controlling the temperature of the at least one storage module, wherein the cooling device has at least one coolant channel, at least one coolant inlet and at least one coolant outlet, wherein the cooling device has a multi-layer film and with this film lies against the at least one storage module, wherein the film comprises a laminate comprising a first plastic film, an enforcement layer connected thereto, a metal film connected to the enforcement layer or a metalized further plastic film connected to the enforcement layer, wherein the cooling device further comprises a further multi-layer film, and wherein the further film also comprises a laminate comprising the second plastic film, an enforcement layer connected thereto, a metal film connected to the enforcement layer or a metalized further plastic film connected to the enforcement layer.

* * * * *